UNITED STATES PATENT OFFICE.

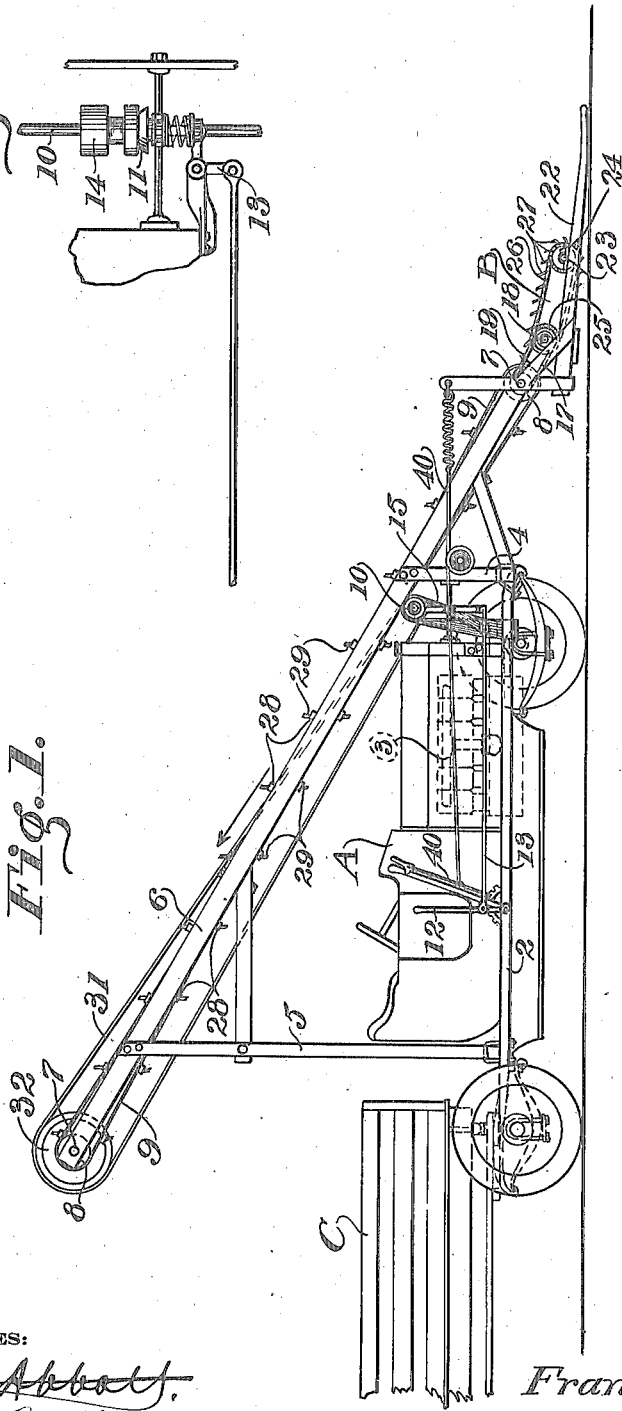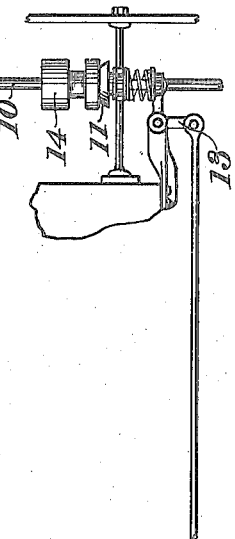

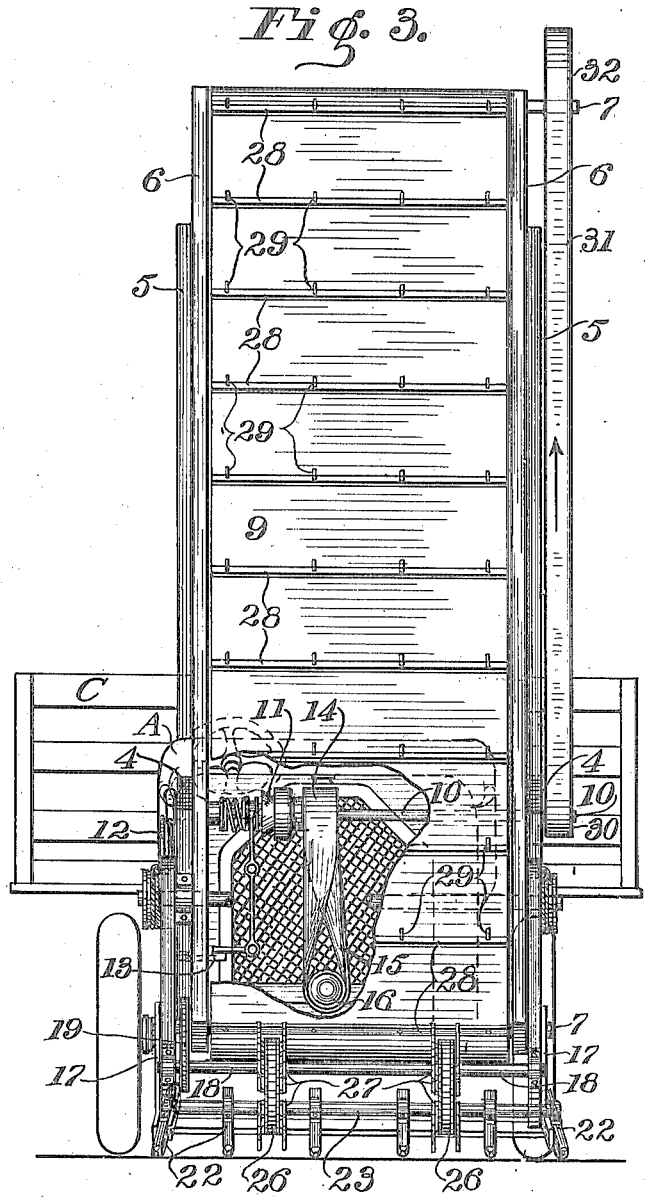

FRANK G. BAUM, OF PIEDMONT, CALIFORNIA.

PORTABLE LOADER AND ELEVATOR.

1,273,312.　　　　　Specification of Letters Patent.　　Patented July 23, 1918.

Application filed July 18, 1916. Serial No. 109,913.

*To all whom it may concern:*

Be it known that I, FRANK G. BAUM, a citizen of the United States, residing at Piedmont, in the county of Alameda and State of California, have invented a new and useful Improvement in Portable Loaders and Elevators, of which the following is a specification.

This invention relates to a portable loader and elevator.

One of the objects of the present invention is to provide a simple, substantial elevator or stacker particularly constructed and designed to permit it to be readily mounted on an automobile of standard construction. Another object of the invention is to provide a novel transmission whereby power may be transmitted from the engine of the car to operate the elevator at any time whether the car is standing or traveling in a forward direction. Further objects will hereinafter appear.

The invention consists of the parts and the construction and combination of parts as hereinafter more fully described and claimed, having reference to the accompanying drawings, in which—

Figure 1 is a side elevation of an automobile, showing the application of the invention.

Fig. 2 is a detail view of the transmission clutch.

Fig. 3 is an enlarged front view of Fig. 1, partly broken away.

Referring to the drawings in detail, A indicates in general a motor-driven vehicle of standard construction; 2 the main frame of the vehicle; and 3 the engine. Suitably secured to the forward end of the frame 2 is a pair of connected uprights 4, and similarly secured, near the rear end, is a pair of uprights 5 which coöperate with the first named uprights to form a support for an inclined elevator frame 6. Journaled at each end of the elevator frame is a shaft 7, and secured on said shafts 7 are rollers 8 which support an endless draper belt 9.

Mounted crosswise of the frame 6 and journaled in bearings secured on the underside of the frame is a transmission shaft 10 and mounted on a feather on said shaft is a cone-clutch 11 which is adapted to be operated from the seat of the car by means of a lever 12 and the connecting links 13 as shown. Formed on the opposite member of the clutch is a pulley 14, to which power is transmitted from the engine 3 by means of a cross belt 15 passing over the pulley 10 and a pulley 16 secured on an extension of the engine shaft.

Journaled in a pivotally mounted bracket 17, secured on the lower end of the frame 6, is a shaft 18 to which power is transmitted from the lower shaft 7 through means of a chain drive 19. Connected to the pivotally mounted bracket 17 is a rake frame 22, and journaled crosswise of the rake frame is a shaft 23, on which is secured a plurality of sprocket wheels 24. Secured on the shaft 18 is a plurality of alined sprocket wheels 25 and passing over each pair of alined sprocket wheels 24 and 25 is an endless chain 26, provided with upwardly projecting prongs 27, of any suitable construction, which conveys the hay or other material delivered to the rake frame up to the conveyer belt proper. The conveyer belt is preferably provided with cleats 28 and these in turn act as supports for projecting prongs 29 to prevent any material handled from sliding down the belt; power to drive the belt 9 being transmitted from a pulley 30, secured on one end of the shaft 10, a belt 31 and a pulley 32 which is secured on the upper shaft 7.

The elevator constructed and mounted as here shown may be readily attached to, practically speaking, any standard make of automobile now in use, and while it is in this instance particularly designed as a hay rake and elevator, it is obvious that it may be used for other purposes.

In operation, when the hay in the field has been dried and raked into windrows in the usual manner, it is only necessary to drive the car up to the end of a row and follow the same. The clutch 11 is thrown in the moment the car comes into alinement with a windrow and in this manner permits power from the engine to be transmitted to operate the lower conveyer, generally indicated at B, and the draper belt 9. The teeth of the forked frame practically engaging with the ground will lift the hay up to the conveyer B, and this in turn will deliver it to the draper belt which elevates the hay to the upper roller 8, where it is permitted to discharge into a trailer wagon, generally indicated at C. This wagon may be hauled by a team or, as here shown, may be attached directly to the rear end of the frame 2. The hay is in this manner dropped directly into the wagon and may at the same time be stacked to a considerable height.

The rake frame proper is preferably mounted in a pivotally supported bracket 17 and a lever and link, such as indicated at 40, controlled by the driver of the car, may be operated, when desired, to swing the outer end of the rake frame to an elevated position; this being done when passing over ditches or other obstructions or when the wagon is completely loaded. The clutch 11 may, at the same time, be thrown out to render the unloading mechanism inoperable. The car, with the attached trailer C, may then be driven to the barn and the load removed in any suitable manner.

The provision of the clutch 11 permits the speed of the coöperating conveyer B and the draper belt 9 to be increased or decreased by slipping, in this manner making it possible to drive the conveyer and belt from the car at variable speeds when loading from a windrow irrespective of the speed of the car.

By referring to Fig. 3 it will be seen that the loading and elevating mechanism as a whole is offset with relation to the center of the car. The only object of this mounting is to permit the driver to have a clear view when driving. The device as a whole may, therefore, be offset more or less as conditions may demand, and similarly the upright frames 4 and 5 may be lengthened or shortened to vary the incline of the draper belt and other conditions imposed by different sizes and makes of cars.

The materials and finish of the several parts of the device may otherwise be such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In combination with a vehicle and an inclined frame carried thereby, brackets having vertical arms pivoted between their ends to the lower end of said frame, a rake frame connected to the brackets and extending forwardly therefrom and located below said pivots, a connection above the pivots of one of said brackets and secured to the upper end of one of the vertical arms for raising and lowering the rake frame, and conveying means extending from the rake frame to the top of the inclined frame, said brackets being movable about said pivots while the conveying means retains its operative connection with the inclined frame.

2. In combination with a vehicle and an inclined frame carried thereby, an endless elevator on the frame including a shaft rotatably carried by the lower end of the frame, brackets having vertical arms pivoted between their ends to the ends of said shaft, a rake frame connected to the brackets and extending forwardly therefrom and located below said bracket pivots, and a connection connected to the top of the vertical arm of one of the brackets for raising and lowering the rake frame by moving the brackets about said shaft independent of any movement of said shaft.

3. In combination with a vehicle, an inclined frame having a conveyer, means to mount said frame on the vehicle so that the lower end of the conveyer is disposed in front of the vehicle, a shaft journaled transversely of the frame and arranged adjacent and over the front end of the vehicle, a clutch borne by said shaft, means to drive the conveyer from said shaft, the vehicle having its drive shaft extended in front thereof, means to drive said first named shaft from the vehicle drive shaft, a rake frame associated with the conveyer, and means operable from the vehicle for throwing the clutch into and out of conveyer driving positions.

In testimony whereof I have hereunto set my hand in the presence of two subscribing witnesses.

FRANK G. BAUM.

Witnesses:
JOHN H. HERRING,
FRANCES V. COLE.